Oct. 12, 1943.                F. W. KING                2,331,837
                               AIRCRAFT
              Filed Sept. 6, 1939           5 Sheets-Sheet 1
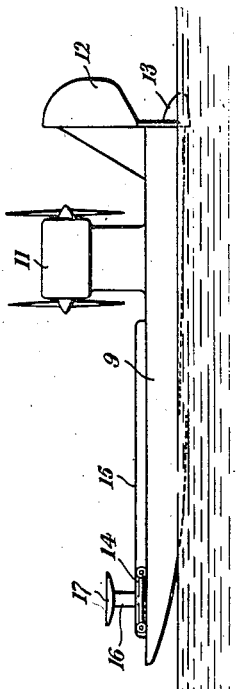
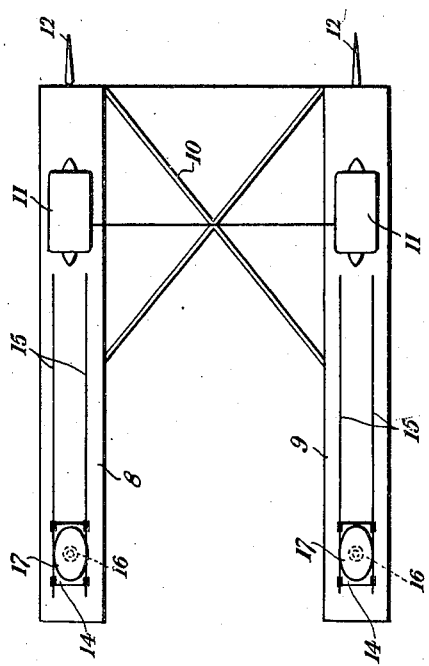
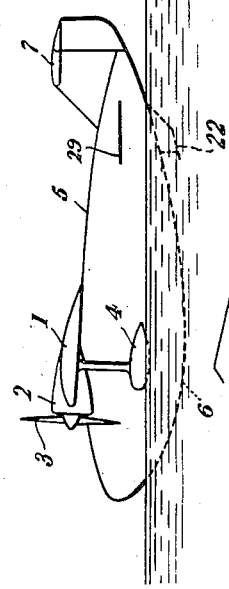
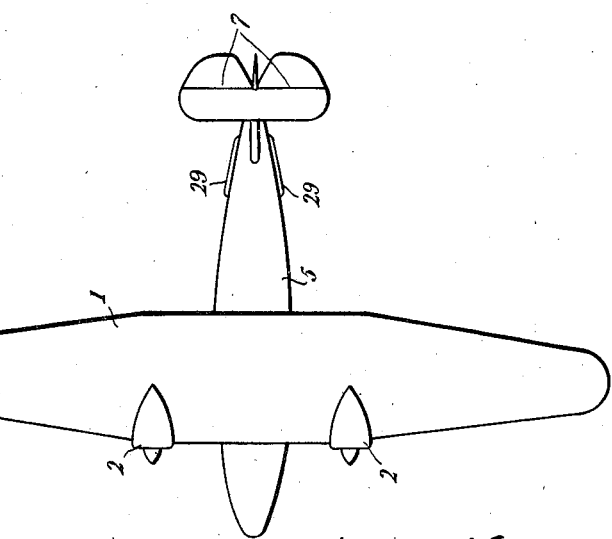

Oct. 12, 1943.  F. W. KING  2,331,837
AIRCRAFT
Filed Sept. 6, 1939  5 Sheets-Sheet 2
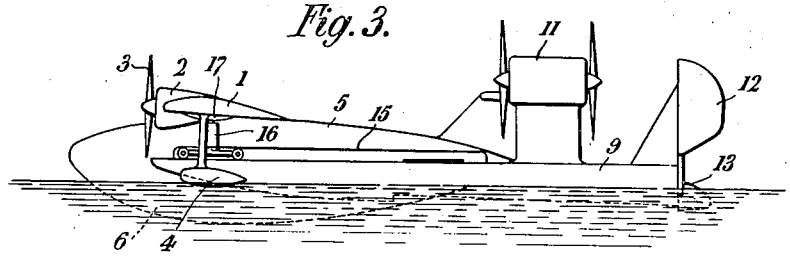
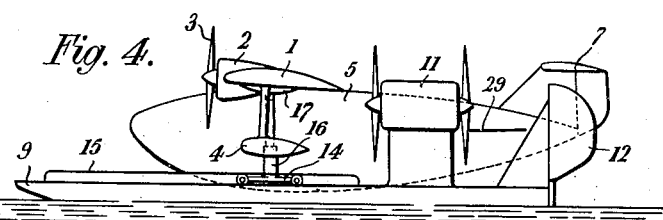
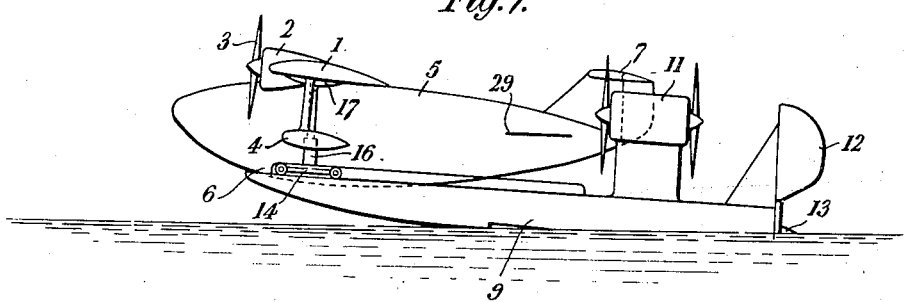
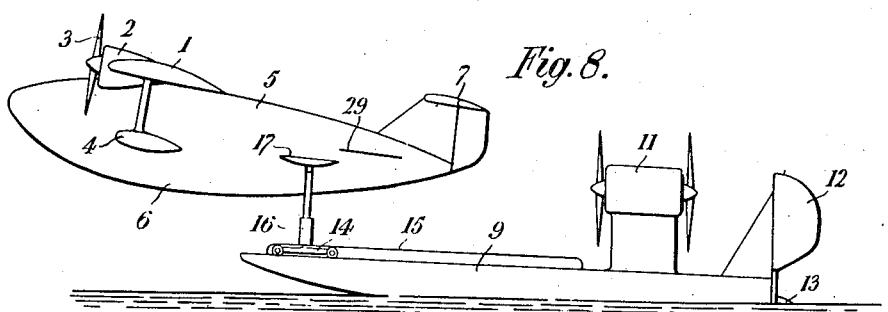

Oct. 12, 1943.    F. W. KING    2,331,837
AIRCRAFT
Filed Sept. 6, 1939    5 Sheets-Sheet 3
Fig. 5.
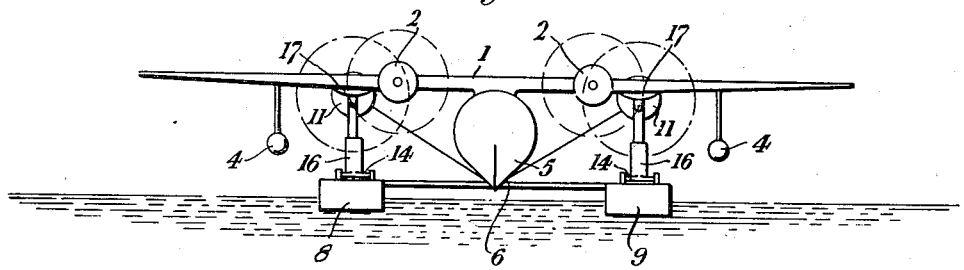
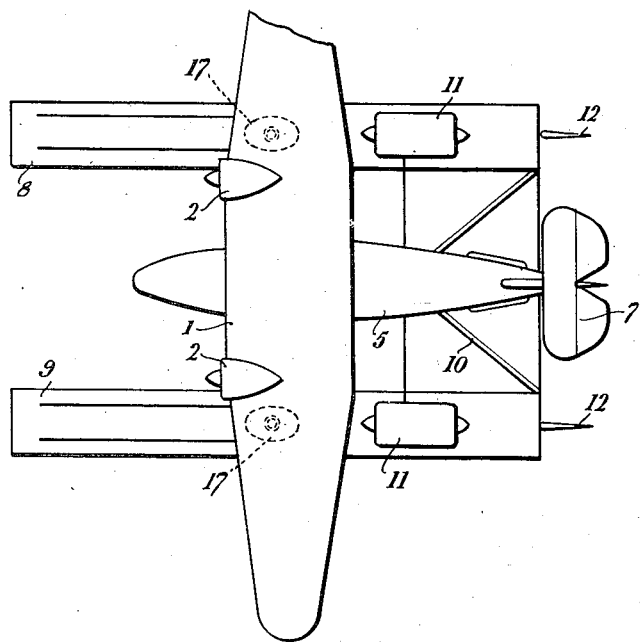
Fig. 6.

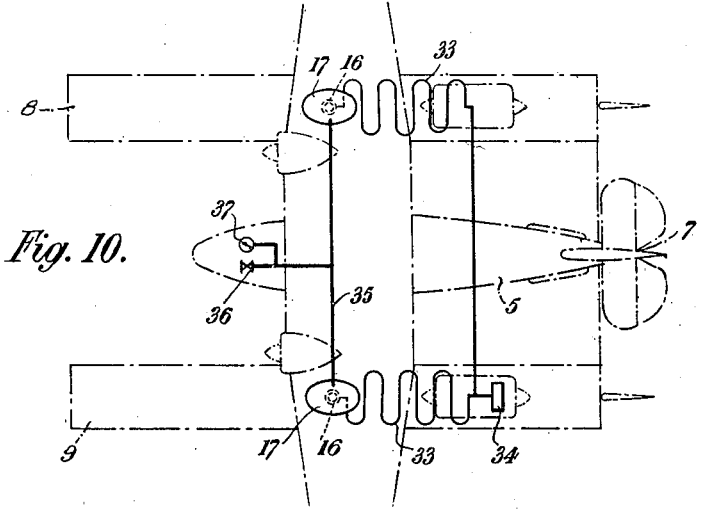
Fig. 10.
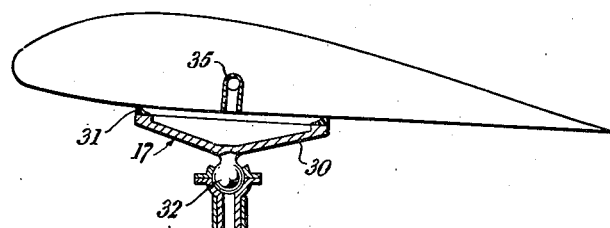
Fig. 11.
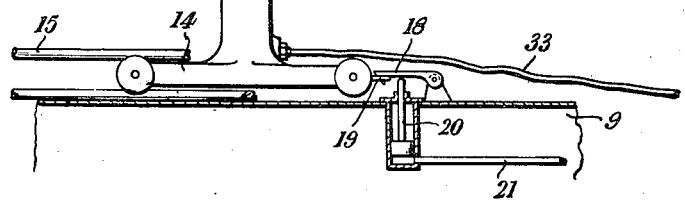
Fig. 9.
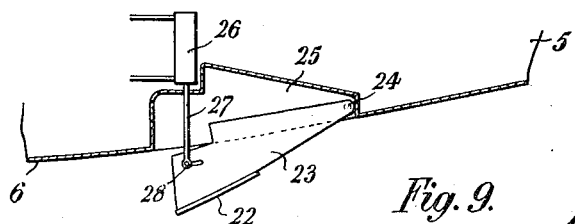

Oct. 12, 1943.　　　　F. W. KING　　　　2,331,837
AIRCRAFT
Filed Sept. 6, 1939　　　　5 Sheets-Sheet 5

Francis William King
Inventor

Patented Oct. 12, 1943

2,331,837

UNITED STATES PATENT OFFICE 2,331,837

AIRCRAFT

Francis William King, New Malden, England

Application September 6, 1939, Serial No. 293,605
In Great Britain November 4, 1938

8 Claims. (Cl. 244—63)

This invention relates to the launching and alighting of aircraft.

The performance of aircraft is limited by take-off and alighting conditions. Land aeroplanes are limited as to wing-loading by take-off and landing considerations, and moreover have to be equipped with undercarriages which serve no useful purpose in flight. In the case of flying boats, the take-off condition necessitates a size and form of hull which renders them aerodynamically inferior to land aeroplanes.

The object of this invention is to provide means for launching and alighting whereby the inferiority of water-operating aircraft may be overcome, and to minimize the effect of take-off and alighting conditions on aircraft generally.

According to this invention, there is provided in or for launching aircraft, a steerable airscrew-propelled surface vehicle for supporting an aircraft to be launched with its wings positioned so as to receive lift from the draught induced by the airscrews which propel the said vehicle, and connections for holding the aircraft to the said vehicle which are releasable when flying speed has been attained.

A further feature of the invention consists in a combined aircraft and launching means comprising an aircraft suitable for alighting on water but unsuitable for taking-off itself, a steerable airscrew-propelled vehicle for supporting said aircraft with its wing positioned so as to receive lift from the draught induced by the airscrews which propel said vehicle, and connections for holding the aircraft to the vehicle which are releasable when flying speed has been attained.

With this arrangement the aircraft can be launched by the said means and can fly to any required destination and then alight without assistance. The separation of the take-off and alighting conditions enables important modifications to be made in the design of aircraft, because in such design only the alighting condition has to be considered. It is well known that alighting at high speeds is safer upon water than upon land and less subject to risk of fire. If only the alighting condition has to be considered it is possible to combine the aerodynamic efficiency of the land aeroplane with the safety and simplicity of water-operating aircraft, and thus to construct a water-alighting aircraft with a small streamline stepless hull of a size and form comparable with the fuselage of an equivalent land aeroplane. If satisfactory conditions for alighting can be secured, such aircraft may operate with higher wing loadings than land aeroplanes and would be free from the handicap of carrying an undercarriage.

As regards launching, important advantages arise in that the extra thrust necessary for take-off is supplied by the launching means, thus relieving the engines of the aircraft from the necessity of high output at ground level and so permitting higher compression ratios, or alternatively, engines of the compression ignition type to be used. For the same reason variable pitch airscrews may, in many cases, be dispensed with on aircraft, fixed-pitch airscrews of high pitch/diameter ratio being substituted.

The launching vehicle may be and preferably is water-borne and so constructed that it may be manœuvred below the wings of a water-alighting aircraft and be provided with means for lifting, adjusting and holding the aircraft in the flying attitude to enable it to lift and fly independently on being released.

Where aircraft are to be launched with the aid of such a launching vehicle, it is desirable that means for holding and releasing the aircraft should be provided of such a nature that concentrated loads are not imposed on the structure of the aircraft to be launched and that such holding and releasing means, should be readily adaptable for holding and releasing aircraft of different shapes, weights and dimensions.

It is a feature of this invention that the means for holding and releasing aircraft during assisted launching comprises vessels or plates (hereinafter termed vacuum plates) adapted to conform to a part of the aircraft and means for exhausting the air from the vacuum plates when the aircraft is resting against them so that the aircraft is held to the said vacuum plates by the pressure of the external atmosphere.

Bearings may be provided on the vacuum plates to enable the longitudinal trim of the aircraft to be adjusted when in position on the launching means.

To release aircraft from the vacuum plates, a suitable valve or valves may be provided, and should be arranged to admit air into all vacuum plates simultaneously.

The vacuum plates should be so constructed that they may be readily detached from the launching means. Various sizes of vacuum plates may be provided, which are shaped to conform to different aircraft, but which have fitting parts of similar dimensions where they are attached to the launching means.

In order that the invention may be clearly understood and more readily carried into practice, several practical embodiments will now be described with reference to the accompanying drawings, in which—

Fig. 1 is a side elevation of a water-alighting aircraft and launching means for this aircraft, the aircraft and launching means being shown separate from each other but in a position for the launching means to be moved beneath the aircraft to support the latter.

Fig. 2 is a plan view of the separate aircraft and launching means as shown in Fig. 1.

Fig. 3 is a side elevation of the aircraft and the launching means as shown in Fig. 1 but with the launching means moved into a position beneath the aircraft ready for supporting it.

Fig. 4 is a similar view to Fig. 3 but showing the aircraft supported on the launching means and in a position ready for commencement of the take-off.

Fig. 5 is a front elevation corresponding to Fig. 4.

Fig. 6 is a plan view corresponding to Fig. 4.

Fig. 7 is a similar view to Fig. 4 illustrating how the aircraft moves forward relative to the launching means prior to release.

Fig. 8 illustrates the aircraft and launching means after release.

Fig. 9 illustrates diagrammatically a part of the water-alighting aircraft illustrating the means for controlling the trim of the aircraft during alighting on water.

Fig. 10 is a diagram of the suction means including vacuum plates for connecting the aircraft to the watercraft.

Fig. 11 is an enlarged detail of one of the trolleys showing the vacuum plates in section, and also showing a releasable means for holding the aircraft in a desired fore and aft position on the launching means.

Figure 12:
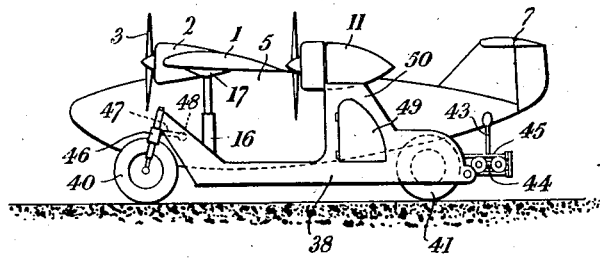
Fig. 12 is a side elevation of a modification, in which the launching means consists of a land vehicle instead of a waterborne vehicle, showing the aircraft in position on the vehicle.

With reference to the embodiment shown in Figs. 1 to 8, the aircraft consists of a high wing type monoplane in the wings 1 of which are mounted two or more engines 2 driving propellers 3, the said wings having wing floats 4. The hull 5 is stepless and of a general streamlined form. Such a hull can be made smaller, and have its centre of gravity located closer to the centre of buoyancy than a stepped hull. It will also be without a planing bottom on the fore body, but have means to be hereinafter described for controlling the trim when alighting. The underside will be preferably formed with a sharp V portion 6 along the keel. This V bottom is distinguished from the V-section planing bottom usually employed on flying boat hulls in that it is an acute V of approximately 90° included angle and with this form of undersurface hydroplaning is not practicable.

The tail planes and elevator surfaces 7 will have to be mounted in such a position as to keep them clear of the spray thrown up on alighting but such surfaces can be designed purely as flying controls and would thus be of smaller size.

Such an aircraft while able to alight on water without assistance could not take-off, and in order to assist the take-off it is proposed to mount it in flying attitude on the water-borne vehicle shown at the right hand side of the aircraft in Figs. 1 and 2 and comprising two hydroplane floats 8, 9 braced together by a suitable framing 10, each float carrying airscrew propulsion means marked 11 and having air and water rudders 12, 13 so that it can be propelled and steered to approach the aircraft from behind and move into a position in which the floats extend one at each side of the hull 5. Each float carries a trolley 14 running in a track 15 and the trolley carries a jack 16, on the extensible portion of which is mounted a vessel or plate 17 shaped to conform to a part of the aircraft and arranged to hold the aircraft by suction applied to the said vessel or plate (hereinafter termed a vacuum plate) to be hereinafter described, which vacuum plate is adapted to be brought into position against the underside of the aircraft wing so as to hold the aircraft in a definite position relatively to the water launching vehicle. When the launching vehicle and the aircraft are brought together, the vacuum plates are located at the forward end of the launching vehicle, as shown in Figs. 1, 2 and 3, but as soon as the aircraft has been secured to the launching vehicle by the vacuum plates in the desired position, then the aircraft is moved rearwardly into the position shown in Fig. 4 to bring the trailing edge of the wings 1 close to the airscrews of the launching vehicle. Thus the wing is so positioned as to receive lift from the draught induced by the airscrews which propel the launching vehicle. Owing to the inflow of the launching vehicle airscrews and to the slip-stream lift of its own airscrews, the aircraft will be air-borne earlier in the launching operation than would otherwise be the case and the hydroplane floats will get "on the step" earlier, which will facilitate take-off.

In order to prevent fouling of the aircraft by the propellers of the launching vehicle, the trolleys 14 are arranged to move forwardly with the aircraft just prior to release and in such forward movement the aircraft will be guided by the trolleys on each hydroplane float and prevented from turning to right or to left until the tail unit has been brought sufficiently clear of the airscrews of the launching vehicle.

Means may be provided for preventing the trolleys from moving forwardly until just before the take-off of the aircraft and a form of such means is shown, by way of example, in Fig. 11 and comprises a catch 18 on each float for engaging a metal loop 19 extending from the base of the jack 16, said catch being adapted to be disengaged by a hydraulic plunger 20 which may be connected through the pipe 21 with a pump (not shown) for supplying liquid pressure.

Provision may be made for an operator for the launching vehicle to be accommodated in one of the supports for the launching vehicle airscrews and this operator will be provided with suitable controls for the power plant of these airscrews, the air and water rudders and the said release for the catches 18.

As previously stated the aircraft would be able to alight itself but in order to keep the airscrews clear of the water during the alighting run, it will be necessary to keep the hull in a "tail down" attitude. This may be achieved by the device shown in Figs. 1 and 9 and comprising a small hydrovane 22 located well aft of the centre of gravity in a position to enter the water slightly in advance of the hull and exert a downward pull which would oppose the diving tendency. The hydrovane would be normally mounted on a vertical plate 23 hinged at 24 on its after end and retractable into a recess 25 in the keel. Any suitable retracting means may be provided, such as the hydraulic cylinder 26, the piston rod 27 of which is connected by a pin and slot connection 28 to the plate.

It will be understood that the recess 25 will be closed to the interior of the hull so as to prevent the ingress of water, the piston rod only extending through the closure and being carried in a suitable packing joint. Thus in normal flight the hydrovane and its supporting parts will lie flush with the undersurface of the hull. This feature enables water-alighting aircraft to be constructed with a very small airscrew clearance. It is also desirable to provide means for preventing the tail surfaces of such machines from being damaged by water thrown up during the alighting run and also to prevent the too deep immersion of the tail under the influence of the hydrovane and a convenient manner of doing this consists in fitting vanes 29 along the sides of the hull of the aircraft above the normal load water line and in a direction parallel to the air stream in normal flight. Vanes so arranged act as planing surfaces when brought down to the water and oppose the downward pull of the hydrovane 22.

To hold the aircraft in position upon the launching vehicle and to release it when flying speed has been reached, it is desirable that means be employed which will impose no concentrated loads upon the aircraft structure and for this purpose it is, as previously stated, proposed to employ vacuum plates 17, consisting of shallow saucer-like members 30, as shown in Fig. 11, having rubber edges 31. One of these vacuum plates is mounted on each trolley and adapted to be applied to the undersurface of the aircraft wing 1 and then exhausted. Each plate 17 is universally mounted by the joint 32 on the upper end of the extensible portion of the hydraulic or other jack and is connected, for instance as shown diagrammatically in Fig. 10, by a flexible pipe line 33 to an exhausting pump 34 driven preferably by an auxiliary engine.

The release of the plate 17 is effected by admitting air to the vacuum plate by providing a passage 35 in the wing communicating with the undersurface of the wing at the part to which the vacuum plate is to be applied, said passage being controlled by a valve 36 operable by the pilot either to close the said passage and prevent air from being admitted to the vacuum plate to destroy the suction or to admit the air at will. A pressure gauge 37 may be provided in this passage to indicate to the pilot whether the suction is applied to the plate or not. The complete absence of mechanism for holding the aircraft in position and releasing it would make the device cheap to construct and render it more reliable in operation while no precise alignment of fitting parts is necessary to mount the aircraft in position for launching.

Figure 13:
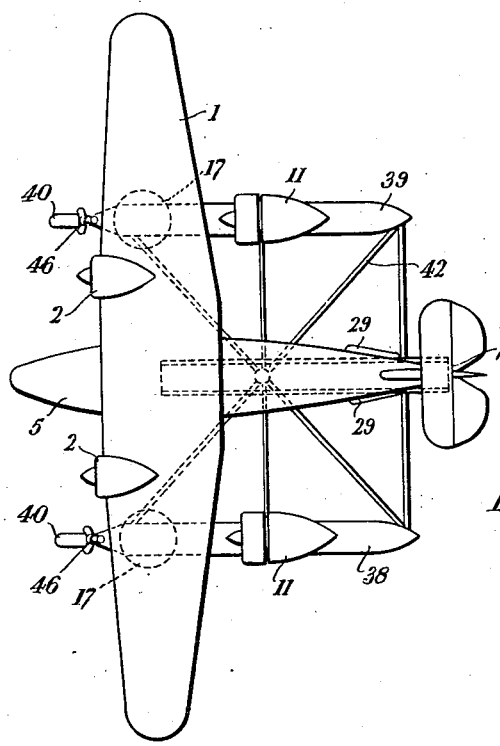
Fig. 13 is a plan view of the arrangement shown in Fig. 12.
Figure 14:
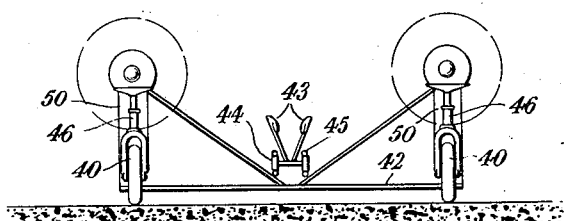
Fig. 14 is a front elevation of the land vehicle itself.

In the application of the arrangement to a land vehicle for launching aircraft from the ground instead of a water-borne vehicle for launching it from the surface of water, the aircraft and launching means employed may be somewhat similar to that described and illustrated in Figs. 1 to 8 and like parts are indicated by like references in Figs. 12 to 14 which show a suitable land launching vehicle. The launching vehicle consists of two wheeled frames 38, 39, each constructed similarly to a motorcycle with a front steerable wheel 40 and a rear wheel 41. These two wheeled frames are braced by a suitable framework marked 42. In this construction the jack 16 and the vacuum plates 17 carried thereon are stationary on the wheeled frames and a cradle 43 is provided to receive and support the tail of the aircraft and to guide it during forward motion of the vehicle relative to the aircraft to mount the aircraft on said vehicle, and also to support and guide it when the aircraft moves forwardly relatively to the vehicle at the time of the take-off. For this purpose the cradle 43 is mounted on a trolley 44 which runs in a track 45 fixed to the frame 42.

In order to make the front wheels steerable they are mounted in forks 46 which are similar to the front forks of a motorcycle, these forks having a rearward extension 47 operable by a hydraulic control 48 which may be under the control of an operator located in a cabin which is reached through a door 49 in one of the engine mountings 50.

In such a combined aircraft and launching vehicle, owing to the positioning of the wing so as to receive lift from the draught induced by the airscrews on the vehicle as well as to the slipstream lift of its own airscrews, the aircraft element will be air-borne earlier in the launching operation than would otherwise be the case and this enables a very light structure to be employed, giving very favourable weight to thrust ratios.

It will be obvious that the total engine power of the launching craft or vehicle may greatly exceed that of the aircraft, and thus the thrust/weight ratio will be more favourable than is possible to any aeroplane. Because of this, aircraft of very high wing-loadings may be launched within a restricted space. This quick take-off is further assisted by the positioning of airscrews of the launching craft or vehicle behind the wings of the aircraft.

The invention is particularly applicable to tailless aeroplanes in which it is unnecessary to provide for forward and backward travel while supported on the launching craft or vehicle.

From the pilot's point of view, assisted take-off by the hereinbefore described means may differ little from ordinary take-off technique. Although the speed and course of the launching vehicle is under the control of its attendant, the take-off may be completely controlled by the pilot. Since the aircraft is held by universally mounted vacuum plates applied to the under surface of each wing, as soon as the launching run has commenced the aircraft may be trimmed about the axis through universal joints by the normal elevator controls. When flying speed is reached, on the catch 18 being released, the aircraft will move forward along the track and may be put into climbing attitude at the moment of release in exactly the same manner as a seaplane is pulled off the water. Obviously a very simple device, such as that hereinbefore described, may enable the pilot to break the vacuum at the desired moment. This procedure would avoid the necessity for any complicated interconnection of controls.

It will thus be seen that according to this invention water-alighting aircraft can be launched from land or water, while eliminating the undercarriage or landing wheels on the aircraft itself.

It will be understood that with a launching water vehicle steering might be effected by differential use of the port and starboard engines, with or without the air and water rudders. It will also be understood that instead of a launching vehicle with wheels, such a vehicle may be fitted with skis or runners where surface conditions make this desirable, in which case steering would be effected by differential use of the engines, with or without air rudders.

Although in the examples herein described and illustrated, the airscrews of the launching craft or vehicle are mounted upon the engine shaft, the engines could for considerations of stability be mounted below the airscrew axis in the floats or in the lower part of the vehicle, in which case the airscrews would be driven by toothed gearing, chains or shafts or the like.

The launching vehicle engines may be interchangeable with those of the aircraft so that the whole may be standardised.

What I claim as my invention and desire to secure by Letters Patent is:

1. Means for launching aircraft comprising an airscrew-propelled surface vehicle, and means for supporting an aircraft to be launched with its wings positioned so as to be within one diameter forward of the airscrews on said surface vehicle, said supporting means holding said aircraft to the said device until flying speed has been attained.

2. In combination, an aircraft, an airscrew-propelled surface vehicle, and means for supporting the said craft with its wings positioned so as to be within one diameter forward of the airscrews on said surface vehicle, the said means also holding said aircraft to the said vehicle until flying speed has been attained.

3. Means for launching aircraft comprising at least two floats, a framing bracing said floats together, airscrew-propelling means on said floats, steering means on said floats and means for supporting an aircraft to be launched with its wings positioned so as to be within one diameter forward of the airscrews on said floats, the said means also holding said aircraft to the said floats until flying speed has been attained.

4. Means for launching aircraft comprising at least two wheeled frames, a framing bracing said frames together, airscrew-propelling means on said frames, means for steering said frames, and means for supporting an aircraft to be launched with its wings positioned so as to be within one diameter forward of the airscrews on said frames, the said means also holding said aircraft to the said frames until flying speed has been attained.

5. Means for launching aircraft comprising at least two floats, a framing bracing said floats together, airscrew-propelling means on said floats, steering means on said floats, jacks on said floats for raising and supporting an aircraft to be launched with its wings positioned so as to be within one diameter forward of the airscrews on said floats, and means on said jacks for holding said aircraft to the said floats until flying speed has been attained.

6. Means for launching aircraft comprising at least two wheeled frames, a framing bracing said frames together, airscrew-propelling means on said frames, means for steering said frames, jacks on said frames for raising and supporting an aircraft to be launched with its wings positioned so as to be within one diameter forward of the airscrews on said wheeled frames, and means on said jacks for holding said aircraft to the said frames until flying speed has been attained.

7. Means for launching aircraft comprising at least two floats, a framing bracing said floats together, airscrew-propelling means on said floats, steering means on said floats, jacks on said floats for raising and supporting an aircraft to be launched, trolleys carrying said jacks and arranged to run fore and aft along the floats to position the aircraft with its wings arranged to receive lift from the draught induced by the airscrews on said floats, and means on said jacks for holding said aircraft to the said floats until flying speed has been attained.

8. Means for launching aircraft comprising at least two wheeled frames, a framing bracing said frames together, airscrew-propelling means on said frames, means for steering said frames, jacks on said frames for supporting an aircraft to be launched with its wings positioned so as to receive lift from the draught induced by the airscrews on said frames, means for holding said aircraft to the said device until flying speed has been attained, a fore and aft track on said framing, a trolley mounted to run on said track, a support for the aircraft tail on said trolley, the said track, trolley and tail support being arranged to guide the aircraft when being mounted on and when moving forwardly relatively to the frames after the release of said holding means.

FRANCIS WILLIAM KING.